United States Patent
Lehmann et al.

(10) Patent No.: US 9,127,958 B2
(45) Date of Patent: Sep. 8, 2015

(54) SHARED RIDE DRIVER DETERMINATION

(71) Applicants: Jens Lehmann, Sunnyvale, CA (US); David Sommer, Bruehl (DE)

(72) Inventors: Jens Lehmann, Sunnyvale, CA (US); David Sommer, Bruehl (DE)

(73) Assignee: SAP SE, Walldorf (DE)

( * ) Notice: Subject to any disclaimer, the term of this patent is extended or adjusted under 35 U.S.C. 154(b) by 226 days.

(21) Appl. No.: 13/733,405

(22) Filed: Jan. 3, 2013

(65) Prior Publication Data
US 2014/0188775 A1 Jul. 3, 2014

(51) Int. Cl.
*G06N 5/00* (2006.01)
*G06F 1/00* (2006.01)
*G01C 21/34* (2006.01)

(52) U.S. Cl.
CPC ................ *G01C 21/3438* (2013.01)

(58) Field of Classification Search
CPC ........... G06N 5/02; G06N 5/04; G06N 5/022; G06F 19/03
See application file for complete search history.

(56) References Cited

U.S. PATENT DOCUMENTS

| | | | |
|---|---|---|---|
| 2010/0209892 A1* | 8/2010 | Lin et al. | 434/71 |
| 2013/0178205 A1* | 7/2013 | Singhal | 455/435.1 |
| 2013/0226365 A1* | 8/2013 | Brozovich | 701/1 |

* cited by examiner

*Primary Examiner* — Jeffrey A Gaffin
*Assistant Examiner* — Kalpana Bharadwaj
(74) *Attorney, Agent, or Firm* — Kenyon & Kenyon LLP

(57) ABSTRACT

Values of a variable affecting the determination of the driver of a shared ride may be calculated. Each value may be associated with a respective potential driver. An optimal value from the calculated values may be selected. A potential driver associated with the selected optimal value may be assigned as the driver of the shared ride. The variable may be carbon emission, electricity consumption, passenger to driver role ratio, driving distance, driving time, vehicle size, fuel efficiency, electricity to gasoline usage ratio, accident occurrence, vehicle safety, vehicle comfort, or vehicle speed. The optimal value may be the lowest value or the highest value from the calculated values. Each value may be calculated based on parameters specified by the respective potential driver.

16 Claims, 3 Drawing Sheets

100

200

300

400

(12) United States Patent

SHARED RIDE DRIVER DETERMINATION

BACKGROUND

While driving has many benefits, driving has some drawbacks as well. For example, driving can be expensive because of fuel costs, car maintenance, insurance, etc. With the number of vehicles on the road increasing, traffic has also become a significant problem especially in metropolitan areas. Further, vehicles typically emit $CO_2$, and many localities have enacted $CO_2$ emissions reduction strategies with a focus on car emissions. Thus, it would be beneficial to reduce the number of vehicles on the road.

"Carpooling" can reduce the number of vehicles on the road. Carpooling is where two or more people ride together in a single vehicle instead of each driving alone in their own individual vehicle. A carpooling system may automatically match users into a shared ride based on various parameters specified by the users. The carpooling system may assign one of the matched users as the driver of the shared ride. However, conventional carpooling systems do not have an efficient mechanism to determine the driver of the shared ride.

DETAILED DESCRIPTION

Embodiments may be discussed in systems to efficiently determine the driver of a shared ride. In an embodiment, values of a variable affecting the determination of the driver of a shared ride may be calculated. Each value may be associated with a respective potential driver. An optimal value from the calculated values may be selected. A potential driver associated with the selected optimal value may be assigned as the driver of the shared ride. In an embodiment, the variable may be carbon emission, electricity consumption, passenger to driver role ratio, driving distance, driving time, vehicle size, fuel efficiency, electricity to gasoline usage ratio, accident occurrence, vehicle safety, vehicle comfort, or vehicle speed. In an embodiment, the optimal value may be the lowest value or the highest value from the calculated values. In an embodiment, each value may be calculated based on parameters specified by the respective potential driver.

In an embodiment, a first set of values of a first variable affecting the determination of the driver of a shared ride may be calculated. Each value from the first set of values may be associated with a respective potential driver. A second set of values of a second variable affecting the determination of the driver of the shared ride may be calculated. Each value from the second set of values may be associated with the respective potential driver. A set of weighted sums based on each value from the first set of values and each value from the second set of values may be determined. Each weighted sum from the set of weighted sums may be associated with the respective potential driver. An optimal weighted sum from the set of weighted sums may be selected. A potential driver associated with the selected optimal weighted sum may be assigned as the driver of the shared ride.

Figure 1:
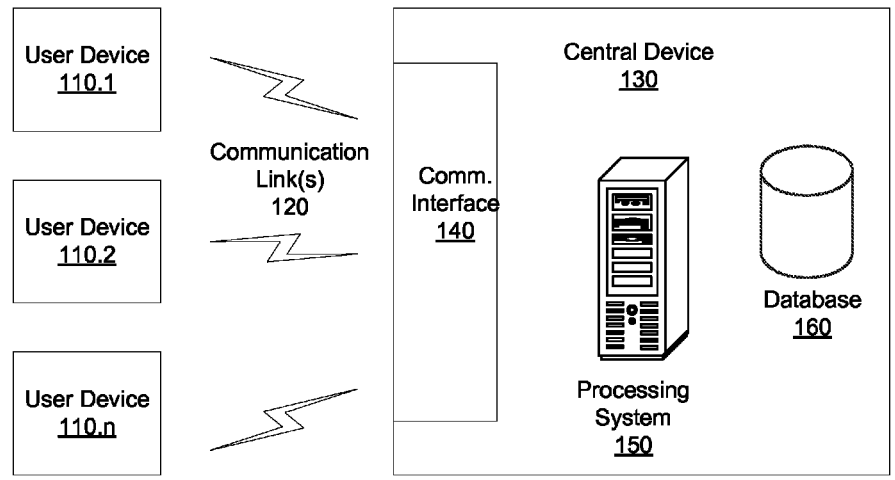
FIG. 1 is a simplified block diagram of an automated ride scheduling system according to an embodiment of the present invention.

FIG. 1 illustrates a simplified block diagram of an automated ride scheduling system 100 according to an embodiment of the present invention. The system 100 may include a plurality of user devices 110.1-110.n that are communicatively coupled via communication link(s) 120 to a central device 130. The communication link(s) 120 may be provided as a computer network or a wireless network such as a cellular network, WLAN network, short range communication network (i.e. BLUETOOTH®) or a combination of different wired and/or wireless networks. For example, the user device 110.1 may initially communicate with a cellular network then thru an IP network to access the central device 130.

The central device 130 may include a communication interface 140, a processing system 150, and a database 160. The communication interface 140 may be compatible with various networks provided by the communication link(s) 120. The processing system 150 may execute a ride sharing application stored thereon. Information associated with the application may be stored in the database 160. The database 160 may be provided as a single database or a combination of multiple databases.

Figure 2:
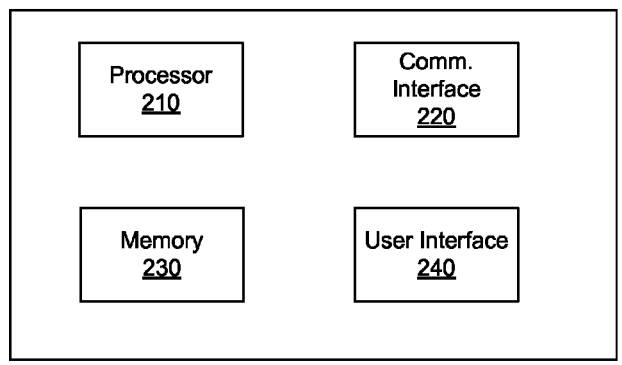
FIG. 2 is a simplified block diagram of a user device according to an embodiment of the present invention.

FIG. 2 illustrates a simplified block diagram of a user device 200 according to an embodiment of the present invention. The user device 200 may include a processor 210, a communication interface 210, a memory 230, and a user interface 240. The user device 200 may be provided as a desktop computer, laptop, tablet, pda, cellular phone, vehicle navigation system, or other suitable devices.

The processor 210 may control the operations of the user device 200. The processor 210 may be any of a plurality of conventional processing systems, including microprocessors, digital signal processors, and field programmable logic arrays.

The communications interface 210 may allow the user device to communicate with the central device. The communications interface may be a wireless internet interface, a wired internet interface, cellular network interface, Bluetooth interface, or any suitable communication protocol interface.

The memory 230 may store program instructions as well as other data, for example, ride sharing application data. Memory 230 may include any combination of conventional memory circuits, including, electrical, magnetic, or optical memory systems. For example, memory 230 may include read only memories, random access memories, and bulk storage.

The user interface 240 may include a display screen and input device. The display screen may be, for example, an LCD screen, a CRT, a plasma screen, an LED screen or the like. The input device may be a keyboard, a mouse, touch screen sensors or any other user input device that would allow a user to interact with the user device 200.

A ride sharing application user may specify a set of ride sharing parameters to automatically schedule a ride with one or more other users. The user may specify the parameters through any type of interface on a user device including a web interface, a mobile interface, and/or a stand-alone application interface. The parameters may include values representing a start location, end location, traveling time, role, detour time, vehicle information such as vehicle make, model, preferences such as social compatibility preferences (e.g., gender, age, occupation) and vehicle preferences (e.g., type of music played in the vehicle, temperature within the vehicle, size of the vehicle). The role may represent whether the user prefers to be a driver or a passenger. The detour time may represent the time the user is willing to prolong his ride in order to pick up and drop off passengers. The set of parameters specified by a user for a ride may be referred to as the user's ride intent.

The ride sharing application may receive the user's ride intent and may compare it with ride intents entered by other users. The ride sharing application may then schedule a shared ride between a set of users with matching ride intents. If a threshold number of parameters in a first user's ride intent and a second user's ride intent match, the ride sharing application may determine that the two ride intents match. The ride sharing application may determine that there is match between a parameter of a first user and a corresponding parameter of a second user as long as the values of the parameters are within a tolerance level. For example, the application may determine that there is match between a start location of A and start location of B as long as location A and location B are within a particular distance from each other. Similarly, the application may determine that there is match between a vehicle music preference of "classical pop music" and a vehicle music preference of "contemporary pop music" since both match on the pop music aspect. The tolerance level may vary depending on the user and/or the parameter.

A person having ordinary skill in the art will appreciate that certain ride sharing parameters do not necessarily have to be entered each time a ride request is created. Some parameters may be stored in a user profile so that the parameters don't have to be entered redundantly each time a ride is requested. For example, a user may specify and save her vehicle's make and model in a user profile and the ride sharing application may retrieve this stored information as needed to schedule a ride.

Figure 3:
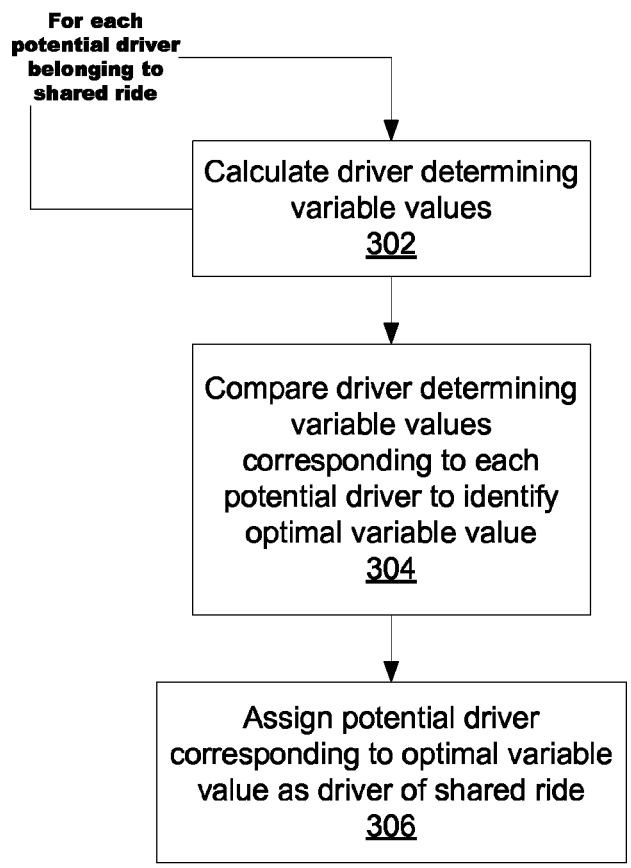
FIG. 3 illustrates a method to assign a driver to a shared ride according to an embodiment.

In an embodiment, the ride sharing application may assign a driver to a scheduled shared ride. The assigned driver may be identified from a set of users (potential drivers) in the shared ride with a role parameter value of "driver" (the user prefers to be a driver but not a passenger) or "driver or passenger" (the user prefers to be either a driver or a passenger). FIG. 3 illustrates a method 300 to assign a driver to a shared ride according to an embodiment. The method 300 may calculate, for each potential driver belonging to a shared ride, an associated variable which influences the determination of the driver of the shared ride 302. The method 300 may compare each calculated variable value to identify an optimal variable value from the set of calculated variable values 304. The method 300 may then assign the potential driver corresponding to the optimal variable value as the driver of the shared ride 306.

In an example, the variable which influences the determination of the driver (the driver determining variable) of the shared ride may be carbon emission. The optimal carbon emission variable value may be the lowest variable value. A shared ride may include two users: user A and user B. Both users may be potential drivers. Method 300 may calculate the carbon emission that will be generated if user A is the driver 302. To calculate the carbon emission value, the method 300 may utilize parameters supplied by user A and/or other users such as the make/model of the vehicle owned by user A and stored reference information such as the amount of carbon emission produced by a representative make/model similar to user A's vehicle. For example, to calculate the estimated carbon emission if user A is the driver for the shared ride, the method 300 may calculate the total number of miles that will be driven if user A is the driver and multiply the number of miles by the estimated amount of carbon emission that will be generated by user A's vehicle per mile. Similarly, the method 300 may calculate the carbon emission that will be generated if user B is the driver 302. Next, the method 300 may compare the calculated carbon emission values and identify the lowest value (i.e., the optimal driver determining variable value) 304. Finally, the method 300 may assign the user corresponding to the lowest carbon emission value as the driver for the shared ride 306. That is, the user generating the least amount of carbon emission as a driver may be assigned as the driver for the shared ride.

In another example, the variable which influences the determination of the driver (the driver determining variable) of the shared ride may be driving time. The optimal driving time value may be the lowest variable value. A shared ride may include two users, user A and user B. Both users may be potential drivers. Method 300 may calculate the driving time if user A is the driver 302. To calculate the driving time, the method 300 may utilize parameters supplied by user A and/or other users such as the departure locations of the users in the shared ride and stored reference information such as the user A's typical driving speed on the roads used for the shared ride (which may, for instance, be obtained from stored historical global positioning system data associated with user A's vehicle). For example, to calculate the estimated driving time if user A is the driver for the shared ride, the method 300 may calculate the total number of miles that will be driven if user A is the driver and multiply the number of miles by user A's average typical driving speed on the roads used for the shared ride. Similarly, the method 300 may calculate the driving time if user B is the driver 302. Next, the method 300 may compare the calculated driving time values and identify the lowest value (i.e., the optimal driver determining variable value) 304. Finally, the method 300 may assign the user corresponding to the lowest driving time value as the driver for the shared ride 306. That is, the user with the lowest driving time as a driver may be assigned as the driver for the shared ride.

In another example, the variable which influences the determination of the driver (the driver determining variable) of the shared ride may be the passenger to driver role ratio. The passenger to driver role ratio associated with a user may be ratio of the number of times that user was assigned to a passenger role compared to a number of times that user was assigned to a driver role. The optimal passenger to driver role ratio value may be the highest variable value. A shared ride may include two users, user A and user B. Both users may be potential drivers. Method 300 may calculate the passenger to driver role ratio of user A 302. To calculate the ratio, the method 300 may utilize parameters supplied by user A and/or other users. Similarly, the method 300 may calculate the passenger to driver role ratio of user B 302. Next, the method 300 may compare the calculated ratios and identify the highest value (i.e., the optimal driver determining variable value) 304. Finally, the method 300 may assign the user corresponding to the highest ratio as the driver for the shared ride 306. That is, the user who has been a passenger the most number of times when compared to the number of times she has been a driver may be assigned as the driver for the shared ride.

Figure 4:
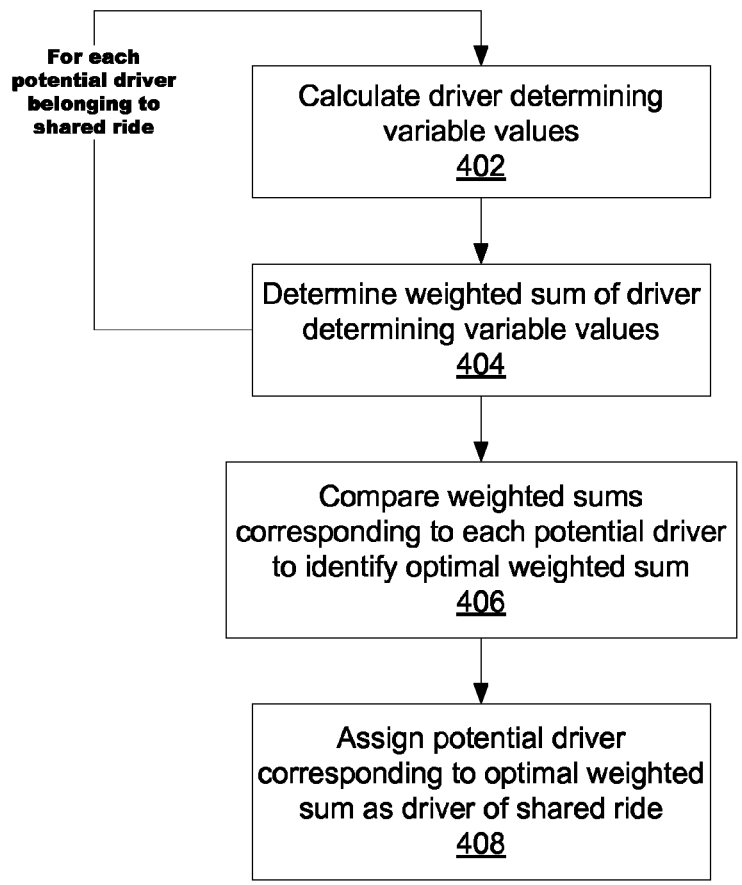
FIG. 4 illustrates a method to assign a driver to a shared ride according to an embodiment.

In certain circumstances, the ride sharing application may utilize multiple variables to determine the driver of a shared ride. FIG. 4 illustrates a method 400 to assign a driver to a shared ride utilizing multiple driver determining variables according to an embodiment. The method 400 may calculate, for each potential driver belonging to a shared ride, associated variables which influence the determination of the driver of the shared ride 402. The method 400 may determine a weighted sum of the calculated variable values 404. The method 400 may compare each weighted sum to identify an optimal weighted sum 406. The method 400 may then assign the potential driver corresponding to the optimal weighted sum as the driver of the shared ride 408.

In an example, the determination of the driver for a shared ride may be influenced by two variables: carbon emission and driving time. Reducing carbon emissions by 3 carbon dioxide equivalents ($CO_2$ e) may be equal to reducing 1 hour of driving time during the shared ride. Therefore, the weighted sum of the two variables for a shared ride may be calculated by the equation: weighted sum=((carbon emission of shared ride measured in $CO_2$ e)/3)+(driving time in hours/1). The optimal weighted sum may be the lowest weighted sum. A shared ride may include two users: user A and user B. Both users may be potential drivers. Method 400 may calculate the carbon emission that will be generated if user A is the driver and the driving time if user A is the driver 402. To calculate the carbon emission, the method 400 may utilize parameters supplied by user A and/or other users such as the make/model of the vehicle owned by user A and stored reference information such as the amount of carbon emission produced by a representative make/model vehicle similar to user A's vehicle as explained in the example pertaining to FIG. 3. To calculate the driving time, the method 300 may utilize parameters supplied by user A and/or other users such as the departure locations of the users in the shared ride and stored reference information such as the user A's typical driving speed on the roads used for the shared ride (which may, for instance, be obtained from stored historical global positioning system data associated with user A's vehicle) as explained in the example pertaining to FIG. 3. The method 400 may determine the weighted sum of user A's driving time and carbon emission based on the equation above 404. Similarly, the method 400 may calculate the weighted sum of carbon emission and driving time if user B is the driver 404. Next, the method 400 may compare the calculated weighted sums and identify the optimal weighted sum (i.e., the lowest weighted sum) 406. Finally, the method 400 may assign the user corresponding to the optimal weighted sum as the driver for the shared ride 408. That is, the user with the lowest weighted sum may be assigned as the driver for the shared ride.

A person having ordinary skill in the art will appreciate that the above examples are illustrative and are not intended to limit the scope of the invention. Although carbon emission and driving time are used as exemplary driver determining variables to explain methods 300 and 400, any driver determining variables may be used including electricity consumption, driving distance, vehicle size, fuel efficiency, electricity to gasoline usage ratio, accident occurrence, vehicle safety, vehicle comfort, and vehicle speed. The driver determining variable(s) may be specified as a user setting and/or an application setting in a ride sharing system. Although the lowest driver determining variable value is illustrated as the optimal value in many of the above examples, the optimal value may vary depending on the context and the variable. The optimal value may be the highest value, the lowest value, or a value between the highest and lowest values.

A person having ordinary skill in the art will appreciate that the equation to determine the weighted sum (FIG. 4) may differ depending on the context. For example, the weighted sum equation may vary based on the particular driver determining variables and the weighting given to each driver determining variable. The equation of the weighted sum may be specified as a user setting and/or an application setting in a ride sharing system.

The foregoing description has been presented for purposes of illustration and description. It is not exhaustive and does not limit embodiments of the invention to the precise forms disclosed. Modifications and variations are possible in light of the above teachings or may be acquired from the practicing embodiments consistent with the invention. For example, some of the described embodiments may include software and hardware, but some systems and methods consistent with the present invention may be implemented in software or hardware alone. Additionally, although aspects of the present invention are described as being stored in memory, this may include other computer readable media, such as secondary storage devices, for example, solid state drives, or DVD ROM; the Internet or other propagation medium; or other forms of RAM or ROM.

We claim:

1. A processor-implemented method comprising:
calculating a plurality of values for each of at least one variable affecting a determination of a potential driver of a shared ride, wherein each value from the plurality of values is associated with a respective potential user and the at least one variable includes at least one of: carbon emission, electricity consumption, driving distance, driving time, vehicle size, fuel efficiency, electricity to gasoline usage ratio, accident occurrence, vehicle safety, vehicle comfort, and vehicle speed;
determining an intent of the user, based on each value associated with the user;
matching users based on a threshold number of variables having values for each user that are within a tolerance of each other;
selecting an optimal value from the plurality of values for the at least one variable; and
assigning the potential driver based on the potential driver being associated with the selected optimal value for the at least one variable as the driver of the shared ride.

2. A processor-implemented method comprising:
calculating a plurality of values for each of at least one variable affecting a determination of a potential driver of a shared ride, wherein each value from the plurality of values is associated with a respective potential user;
determining a user intent, based on each value associated with the user;
matching users based on a threshold number of variables having values for each user that are within a tolerance of each other;
selecting an optimal value from the plurality of values for the at least one variable; and
assigning the potential driver based on the potential driver being associated with the selected optimal value for the at least one variable as the driver of the shared ride.

3. The method of claim 2, wherein the variable is one of carbon emission, electricity consumption, passenger to driver role ratio, driving distance, driving time, vehicle size, fuel efficiency, electricity to gasoline usage ratio, accident occurrence, vehicle safety, vehicle comfort, and vehicle speed.

4. The method of claim 2, wherein the optimal value is one of a lowest value and highest value from the plurality of values.

5. The method of claim 2, wherein the each value is calculated based on parameters specified by the respective potential user.

6. A processor-implemented method comprising:
calculating a first plurality of values of a variable affecting a determination of a driver of a shared ride, wherein each value from the first plurality of values is associated with a respective potential driver, and the variable includes at least one of: carbon emission, electricity consumption, driving distance, driving time, vehicle size, fuel efficiency, electricity to gasoline usage ratio, accident occurrence, vehicle safety, vehicle comfort, and vehicle speed;

calculating a second plurality of values of a second variable affecting the determination of the driver of the shared ride, wherein each value from the second plurality of values is associated with the respective potential driver;

determining a plurality of weighted sums based on the each value from the first plurality of values and the each value from the second plurality of values, wherein each weighted sum from the plurality of weighted sums is associated with the respective potential driver;

selecting an optimal weighted sum from the plurality of weighted sums;

assigning a potential driver associated with the selected optimal weighted sum as the driver of the shared ride.

7. An apparatus comprising:

a processor to:

calculate a plurality of values for each of at least one variable affecting a determination of a potential driver of a shared ride, wherein each value from the plurality of values is associated with a respective potential user and the at least one variable includes at least one of: carbon emission, electricity consumption, driving distance, driving time, vehicle size, fuel efficiency, electricity to gasoline usage ratio, accident occurrence, vehicle safety, vehicle comfort, and vehicle speed;

determining a user intent, based on each value associated with the user;

matching users based on a threshold number of variables having values for each user that are within a tolerance of each other;

select an optimal value from the plurality of values for the at least one variable; and assign the potential driver based on the potential driver being associated with the selected optimal value for the at least one variable as the driver of the shared ride.

8. The apparatus of claim 7, wherein the variable is one of carbon emission, electricity consumption, passenger to driver role ratio, driving distance, driving time, vehicle size, fuel efficiency, electricity to gasoline usage ratio, accident occurrence, vehicle safety, vehicle comfort, and vehicle speed.

9. The apparatus of claim 7, wherein the optimal value is one of a lowest value and highest value from the plurality of values.

10. The apparatus of claim 7, wherein the each value is calculated based on parameters specified by the respective potential user.

11. An apparatus comprising:

a processor to:

calculate a first plurality of values of a first variable affecting a determination of a driver of a shared ride, wherein each value from the first plurality of values is associated with a respective potential driver, and the variable includes at least one of: carbon emission, electricity consumption, driving distance, driving time, vehicle size, fuel efficiency, electricity to gasoline usage ratio, accident occurrence, vehicle safety, vehicle comfort, and vehicle speed;

calculate a second plurality of values of a second variable affecting the determination of the driver of the shared ride, wherein each value from the second plurality of values is associated with the respective potential driver;

determine a plurality of weighted sums based on the each value from the first plurality of values and the each value from the second plurality of values, wherein each weighted sum from the plurality of weighted sums is associated with the respective potential driver;

select an optimal weighted sum from the plurality of weighted sums;

assign a potential driver associated with the selected optimal weighted sum as the driver of the shared ride.

12. A non-transitory computer-readable medium embodied with computer-executable instructions for causing a computer to execute instructions, the computer instructions comprising:

calculating a plurality of values for one or more variables affecting a determination of a driver of a shared ride, wherein each value from the plurality of values is associated with a respective potential user;

determining a user intent, based on each value associated with the user;

matching users based on a threshold number of variables having values for each user that are within a tolerance of each other;

selecting an optimal value from the plurality of values for the at least one variable; and assigning the potential driver based on the potential driver being associated with the selected optimal value for the at least one variable as the driver of the shared ride.

13. The medium of claim 12, wherein the variable is one of carbon emission, electricity consumption, passenger to driver role ratio, driving distance, driving time, vehicle size, fuel efficiency, electricity to gasoline usage ratio, accident occurrence, vehicle safety, vehicle comfort, and vehicle speed.

14. The medium of claim 12, wherein the optimal value is one of a lowest value and highest value from the plurality of values.

15. The medium of claim 12, wherein the each value is calculated based on parameters specified by the respective potential user.

16. A non-transitory computer-readable medium embodied with computer-executable instructions for causing a computer to execute instructions, the computer instructions comprising:

calculating a first plurality of values of a first variable affecting a determination of a driver of a shared ride, wherein each value from the first plurality of values is associated with a respective potential driver, and the variable includes at least one of: carbon emission, electricity consumption, driving distance, driving time, vehicle size, fuel efficiency, electricity to gasoline usage ratio, accident occurrence, vehicle safety, vehicle comfort, and vehicle speed;

calculating a second plurality of values of a second variable affecting the determination of the driver of the shared ride, wherein each value from the second plurality of values is associated with the respective potential driver;

determining a plurality of weighted sums based on the each value from the first plurality of values and the each value from the second plurality of values, wherein each weighted sum from the plurality of weighted sums is associated with the respective potential driver;

selecting an optimal weighted sum from the plurality of weighted sums;

assigning a potential driver associated with the selected optimal weighted sum as the driver of the shared ride.

* * * * *